(12) United States Patent
Ko et al.

(10) Patent No.: US 9,921,702 B2
(45) Date of Patent: Mar. 20, 2018

(54) TOUCH DISPLAY APPARATUS AND SHIFT REGISTER THEREOF

(71) Applicant: AU Optronics Corporation, Hsin-Chu (TW)

(72) Inventors: Chien-Chuan Ko, Hsin-Chu (TW); Meng-Chieh Tsai, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 65 days.

(21) Appl. No.: 15/256,871

(22) Filed: Sep. 6, 2016

(65) Prior Publication Data

US 2017/0102801 A1    Apr. 13, 2017

(30) Foreign Application Priority Data

Oct. 13, 2015   (TW) .............................. 104133465 A

(51) Int. Cl.
*G06F 3/044* (2006.01)
*G06F 3/041* (2006.01)
(Continued)

(52) U.S. Cl.
CPC ............ *G06F 3/044* (2013.01); *G06F 3/0416* (2013.01); *G09G 3/3677* (2013.01); *G09G 3/20* (2013.01);
(Continued)

(58) Field of Classification Search
CPC ..... G06F 3/044; G06F 3/0416; G09G 3/3677; G09G 3/20; G09G 2310/0267; G09G 2310/0286
See application file for complete search history.

(56) References Cited

U.S. PATENT DOCUMENTS

2007/0063991 A1*  3/2007  Lee ........................ G06F 1/3203
                                                                    345/173
2008/0218489 A1*  9/2008  Park ...................... G06F 3/0416
                                                                    345/173

FOREIGN PATENT DOCUMENTS

CN          102287722 A      12/2011
CN          102345826 A       2/2012
(Continued)

*Primary Examiner* — Sejoon Ahn
(74) *Attorney, Agent, or Firm* — McClure, Qualey & Rodack, LLP

(57) ABSTRACT

A touch display apparatus is disclosed herein. The touch display apparatus has a timing controller outputting external signals; a touch driver for outputting touch driving signals according to the touch-enable signal; a scan driver having a multi-stage shift registers outputting scan signals, each shift register having a driving unit electrically connected to a driving node, outputting a first scan signal to an output end according to a clock signal; a pull-up unit outputting a driving voltage to the driving node according to a second scan signal; a pull-down control unit controlling a voltage level of the driving node according to the clock signal; a discharging unit adjusting the voltage level of the driving node according to a first control signal and the first scan signal, wherein the clock signal and the first control signal are in-phase periodic signals and respectively have a rising edge and a falling edge, the falling edge of the first control signal is ahead of that of the clock signal; and a pull-down unit electrically connected to the output end adjusting the voltage level of the output end, wherein the first control signal and the second control signal are complementary periodic signals.

6 Claims, 6 Drawing Sheets

(51) Int. Cl.
*G09G 3/36* (2006.01)
*G09G 3/20* (2006.01)

(52) U.S. Cl.
CPC ............... *G09G 2310/0267* (2013.01); *G09G 2310/0286* (2013.01)

(56) References Cited

FOREIGN PATENT DOCUMENTS

| | | | |
|---|---|---|---|
| CN | 102809119 A | 12/2012 | |
| CN | 203656812 U | 6/2014 | |

* cited by examiner

TOUCH DISPLAY APPARATUS AND SHIFT REGISTER THEREOF

TECHNICAL FIELD

The present disclosure relates to a display scanning apparatus, and in particular, to a display scanning apparatus having a touch function.

BACKGROUND

Recently, mobile hand-held devices have increased in popularity, resulting in a corresponding increase in various LCD display products for such devices. In addition, due to widespread use of smart end devices, integration of a touch function into smart end devices has become a mainstream demand for current products.

Referring to FIG. 1, a conventional smart end device having a touch-display function activates a touch driver in a display-pause period for touch driving. As shown, FIG. 1 is a waveform schematic diagram of a conventional shift register having a touch display function, where a display panel has multiple scan lines, and a scan driver comprising multi-stage shift register circuits, a clock signal CK, scan signals G(n−1), G(n), and driving voltages Q(n−1), Q(n). In each frame period, the shift register circuits output the scan signals according to the clock signal to enable the corresponding scan lines of the display panel. For example, the shift register circuits may raise the driving voltage Q(n−1) of an internal driving node Q according to the clock signal CK to output the scan signal G(n−1). In a display-pause period, the shift register circuits are disabled and suspended from outputting the display driving signal G(n), and all of the external signals such as the clock signal CK are disabled such that the driving voltage Q(n) of the driving node Q is in a floating state at this time, resulting in leakage of the driving voltage Q(n) of the driving node Q with time. The longer the external signals such as the clock signal CK are disabled, the more serious is the leakage of the driving voltage Q(n). When the display driving is restored, the scan signal G(n−1) has leakage due to the floating of the internal driving node of the display driving circuit in the display-pause period, resulting in failure of the scan signal G(n) restored after the display-pause period to output a desired voltage level, thereby degrading the display quality. In addition, the waveform distortion of the restored scan signal G(n) results in inconsistency between the time of a falling edge of the waveform and the time of a falling edge of scan signals from other stages, causing the mura effect. Moreover, the display-pause period generally occurs at a constant position of the scan lines. Since the driving nodes Q of the previous-stage and next-stage shift register circuits are also in the leakage state due to floating, a gate end of a driving transistor of the driving unit for pulling down the scan signals G(n−1), G(n) of an output end is continuously stressed, such that the threshold voltage of the driving transistor drifts.

Thus, it is desired to develop methods and devices to prevent the driving transistor of the shift register circuits from being stressed for long periods of time, which results in component performance deterioration and thus erroneous output.

SUMMARY

An embodiment of the present invention is directed to a shift register having multi-stage shift register circuits outputting a plurality of scan signals, wherein each of the shift register circuits includes: a first transistor having a first end configured to receive a clock signal, a gate end electrically connected to a driving node, and a second end configured to output a first scan signal to an output end; a second transistor having a second end electrically connected to the driving node and outputting a driving voltage to the driving node according to a second scan signal; a third transistor having a first end configured to receive a first control signal, a second end electrically connected to the driving node, and a gate end electrically connected to the output end; and a fourth transistor having a first end electrically connected to the output end, a second end electrically connected to a voltage source, and a gate end configured to receive a second control signal, wherein the clock signal and the first control signal are in-phase periodic signals and respectively have a rising edge and a falling edge, the falling edge of the first control signal is ahead of the falling edge of the clock signal, and the first control signal and the second control signal are complementary signals.

Another embodiment of the present invention is directed to a touch display apparatus, including: a touch driver outputting a plurality of touch driving signals to drive a touch panel according to a touch-enable signal; a scan driver outputting a plurality of scan signals to drive a display panel, wherein during the enable period of the touch-enable signal, a timing controller disables a clock signal, wherein the scan driver has multi-stage shift registers. Each of the shift registers includes: a driving unit electrically connected to a driving node and outputting a first scan signal to an output end according to the clock signal; a pull-up unit electrically connected to the driving node outputting a driving voltage to the driving node according to a second scan signal; a pull-down control unit electrically connected to the driving node and controlling a state of the driving node according to the clock signal; a discharging unit electrically connected to the driving node and adjusting the voltage level of the driving node according to a first control signal and the first scan signal, wherein the clock signal and the first control signal are periodic signals and respectively have a rising edge and a falling edge, and the falling edge of the first control signal is ahead of the falling edge of the clock signal; and a pull-down unit electrically connected to the output end and adjusting the voltage level of the output end according to a second control signal, wherein the first control signal and the second control signal are complementary periodic signals.

The above description of the content of the present disclosure and the following illustration of the embodiments are intended to demonstrate and explain the spirit and principle of the present disclosure and to provide further explanations of the claims of the present disclosure.

BRIEF DESCRIPTIONS OF THE DRAWINGS

DETAILED DESCRIPTIONS

Figure 1:
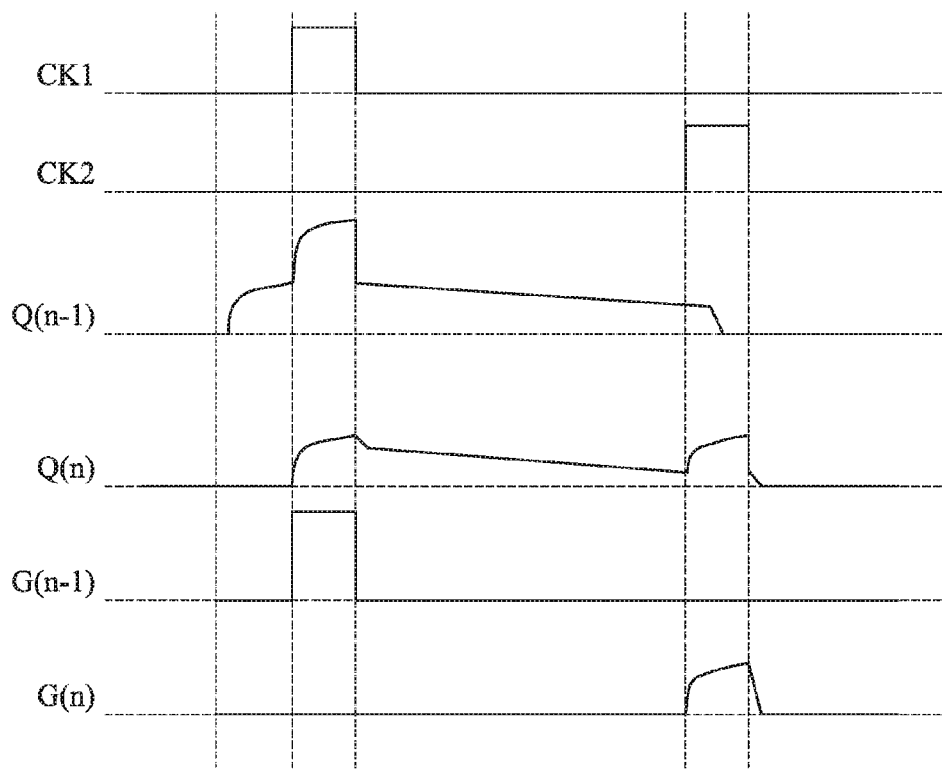
FIG. 1 is a waveform schematic diagram of a shift register according to the prior art.

Embodiments of the invention will be described below in detail in conjunction with the accompanying drawings, but the embodiments are not intended to limit the scope of the present disclosure. The order in which the operations of a structure are described is not to be construed as a limitation, and any structure which is a rearrangement of the components, and the resulting apparatus having an equivalent effect all fall within the scope of the present disclosure. In addition, the figures are merely illustrative and have not been drawn to scale. To facilitate understanding, same elements in the following description are labeled by the same reference numerals.

The terms "first", "second" and the like used herein do not denote any particular order or sequence, are not intended to limit the present disclosure, and are used only for distinguishing between elements or operations described with same technical terms.

Additionally, the terms "coupled" and "connected" used herein may mean that two or more elements are in a direct physical or electrical contact or in an indirect physical or electrical contact, and may also mean that two or more elements co-operate or interact.

Figure 2:
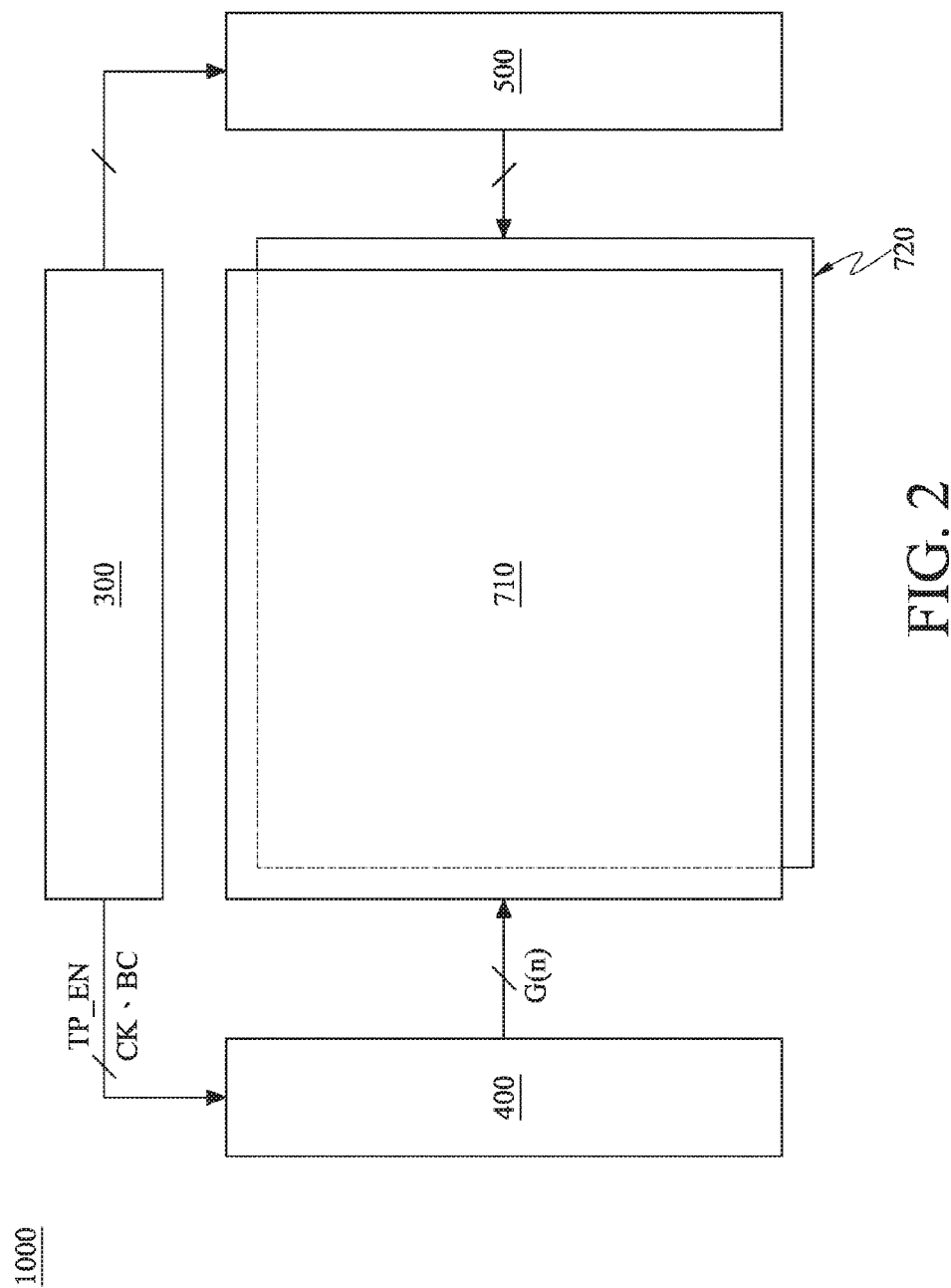
FIG. 2 shows a touch display apparatus according to an embodiment of the present invention.

FIG. 2 shows a touch display apparatus according to an embodiment of the present disclosure. The touch display apparatus 1000 comprises a scan driver 400 which outputs scan signals G(1)-G(N) for driving scan lines (not shown) of a display panel 710; and a touch driver 500 which outputs touch driving signals S(1)-S(N) for driving touch lines (not shown) of a touch panel 720, wherein N is a positive integer, and does not limit that the number of the scan signals G(1)-G(N) must be equal to the number of the touch driving signals S(1)-S(N), and the numbers of the scan signals G(1)-G(N) and the touch driving signals S(1)-S(N) may also be not equal. The touch panel 720 in the touch display apparatus 1000 may be a capacitive touch panel, a photo-sensor panel, a resistive touch panel, a proximity sensing panel or the like but not limited thereto, and a capacitive touch panel is used as an example in an embodiment of the detailed description. The display panel 710 and the touch panel 720 may be an in-cell touch panel. However, the present disclosure is not limited thereto and a combination of the display panel 710 and the touch panel 720 may be used. The scan driver 400 is configured to sequentially output the scan signals G(1)-G(N) to the display panel 710, and the scan driver may be a driving chip (not shown) adhered onto a substrate and may also be a gate on array (GOA) shift register but is not limited thereto. A timing controller 300 outputs signals such as a clock signal CK and a touch-enable signal TP_EN for driving and controlling the operation of the touch driver 500 and the scan driver 400. The touch-enable signal TP_EN may be a signal configured to be enabled by touching, a signal to suspend the display output, a signal to activate touch scanning, or any external signal, and the touch-enable signal TP_EN may also be provided to the scan driver 400 (directly or indirectly) by the touch driver 500.

Figure 3:
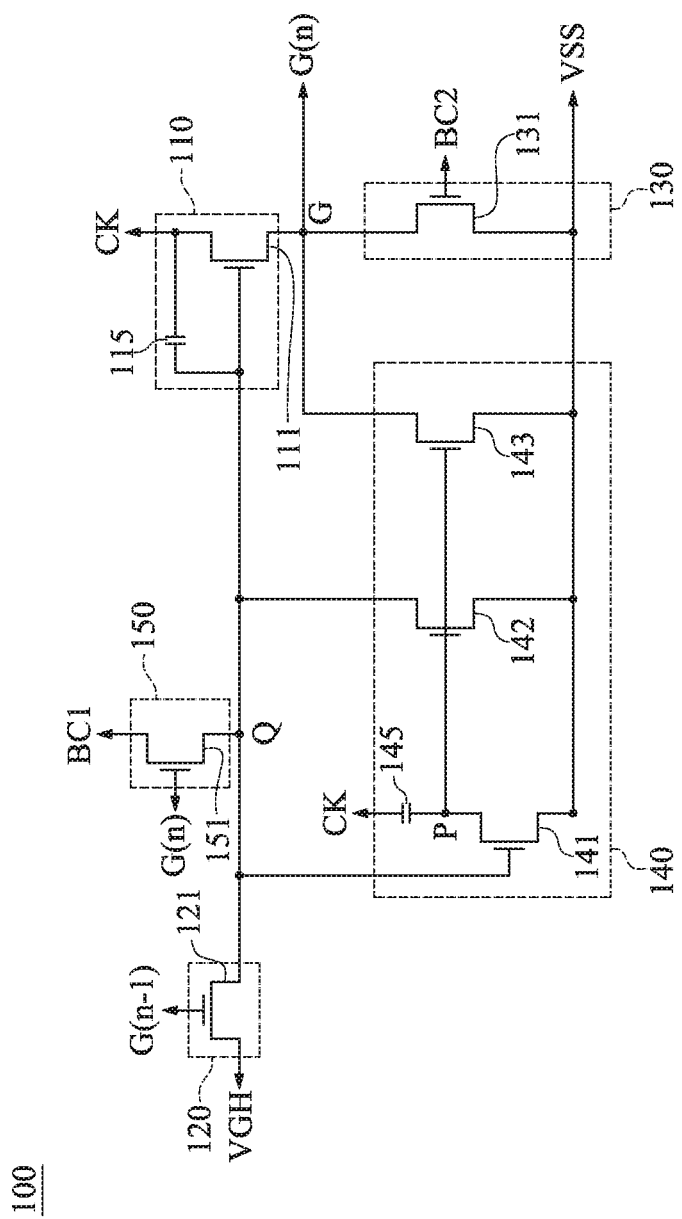
FIG. 3 shows a shift register circuit according to an embodiment of the present invention.

FIG. 3 shows one stage of the shift register circuits 100 of a shift register according to an embodiment of the present disclosure. The N-stage shift register circuit 100 has a driving unit 110, a pull-up unit 120, a pull-down unit 130, a pull-down control unit 140 and a discharging unit 150. The driving unit 110 comprises a transistor 111, the pull-up unit 120 comprises a transistor 121, the pull-down unit 130 comprises a transistor 131, the pull-down control unit 140 comprises a transistor 141, a transistor 142 and a transistor 143, and the discharging unit 150 comprises a transistor 151. Each of the transistors as described herein has a first end, a second end, and a gate end. As these ends/terminals will be understood by persons skilled in the art, they will not be repeatedly described below.

The driving unit 110 outputs the scan signal G(n) according to the clock signal CK. The first end of the transistor 111 of the driving unit 110 is configured to receive the clock signal CK, the gate end of the transistor 111 is electrically connected to a driving node Q, and the second end of the transistor 111 is electrically connected to an output end G for outputting the scan signal G(n) according to the clock signal CK. The driving unit 110 also may include a capacitor 115 electrically connected between the second end of the transistor 111 and the gate end of the transistor 111.

The pull-up unit 120 outputs a driving voltage Q(n) to the driving node Q according to the previous-stage scan signal G(n−1) or the next-stage scan signal G(n+1). The first end of the transistor 121 of the pull-up unit 120 is electrically connected to the gate end of the transistor 121 for receiving the previous-stage scan signal, for example, the scan signal G(n−1), and the second end of the transistor 121 is electrically connected to the driving node Q. In another implementation of the pull-up unit 120, the first end of the transistor 121 of the pull-up unit 120 is coupled to a constant-voltage source VGH which may be a constant-voltage source having a high voltage level, the gate end of the transistor 121 is configured to receive the previous-stage scan signal, for example, the scan signal G(n−1), and the second end of the transistor 121 is electrically connected to the driving node Q.

The pull-down unit 130 pulls down the scan signal G(n) of the output end G according to a control signal BC2 which is inverted with respect to the clock signal CK and has a falling edge ahead of that of the clock signal CK. The first end of the transistor 131 of the pull-down unit 130 is electrically connected to the output end G, the gate end of the transistor 131 is configured to receive the control signal BC2 inverted with respect to a control signal BC1, and the second end of the transistor 131 is electrically connected to a constant voltage source VSS. The constant-voltage source VSS may be a constant-voltage source having a low voltage level. The clock signal CK and the control signal BC2 are complementary periodic signals, the waveforms of the clock signal CK and the control signal BC2 respectively have a rising edge and a falling edge, and the falling edge of the control signal BC2 is ahead of that of the clock signal CK; namely, the duty cycle of the control signal BC2 is less than that of clock signal CK.

The pull-down control unit 140 determines whether the voltage levels of the output end G and the driving node Q are pulled down according to the driving voltage Q(n). The first end of the transistor 141 in the pull-down control unit 140 is electrically connected to a capacitor 145 for receiving the clock signal CK, the gate end of the transistor 141 is electrically connected to the driving node Q, and the second end of the transistor 141 is electrically connected to the voltage source VSS. The capacitor 145 may store the potential of the clock signal CK received such that a node P has a high voltage level, and whether the voltage level of the node P is to be pulled down is determined according to the voltage level of the driving node Q. When the driving node Q is at a high voltage level, the transistor 141 is turned on to pull down the voltage level of the node P, and when the driving node Q is at a low voltage level, the transistor 141 is in a cut-off state and the transistors 142 and 143 are turned on to pull down the voltage level of the driving node Q and the output end G and reduce the leakage current. The first end of the transistor 142 is electrically connected to the driving node Q, the gate end of the transistor 142 is electrically connected to the first end of the transistor 141, and the second end of the transistor 142 is electrically connected to the voltage source VSS. The first end of the transistor 143 is electrically connected to the output end G, the gate end of the transistor 143 is electrically connected to the first end of the transistor 141, and the second end of the transistor 143 is electrically connected to the voltage source VSS. The first end of the transistor 151 of the discharging unit 150 is configured to receive the control signal BC1, the gate end of the transistor 151 is electrically connected to the output end G, and the second end of the transistor 151 is coupled to the driving node Q, wherein the control signal BC1 and the control signal BC2 are inverted and complementary periodic signals; namely, the clock signal CK and the control signal BC1 are in-phase.

However, in addition to the above connection methods of the driving unit 110, the pull-up unit 120, the pull-down unit 130, and the pull-down control unit 140, the shift register of the display scanner in the art of display devices may be implemented in various ways. However, one implementation is only taken as an example in this description, and the present disclosure is not limited thereto. Any reasonable interconnection arrangement of the transistors capable of achieving the circuit having the function of the units above in connection with the driving waveform of the present disclosure is within the scope of the present disclosure.

Figure 4:
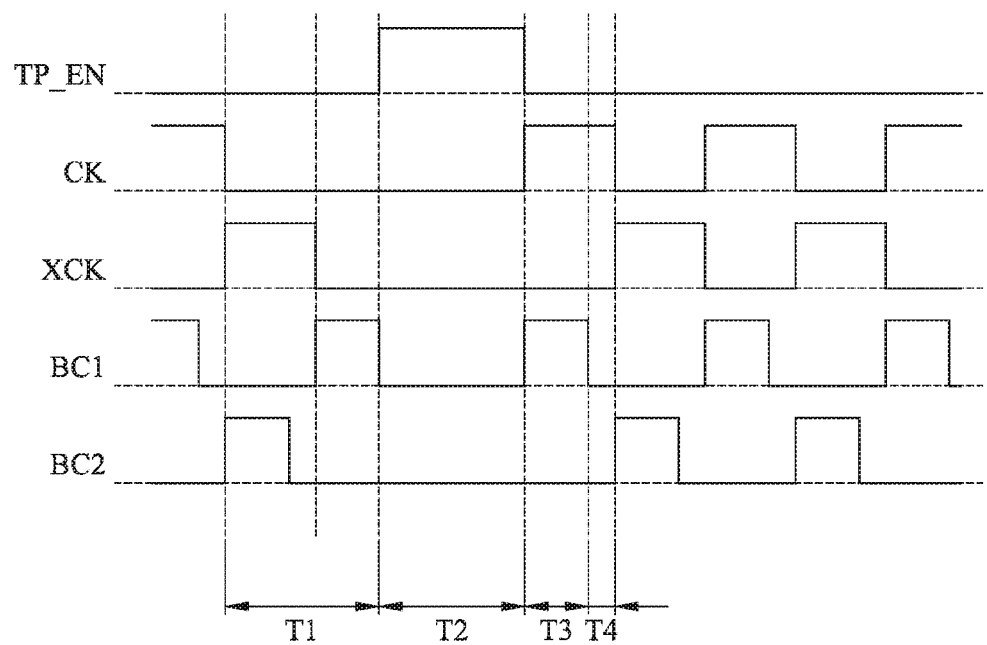
FIG. 4 is a waveform schematic diagram of the shift register circuit in FIG. 3 according to the embodiment of the present invention.

FIG. 4 is a waveform schematic diagram of the shift register circuit 100 in FIG. 3 according to an embodiment of the present disclosure. As shown, a clock signal CK, a clock signal XCK, a control signal BC1 and a control signal BC2 are all periodic signals. The clock signal CK and the clock signal XCK are inverted and complementary signals, and the control signal BC1 and the control signal BC2 also are inverted and complementary signals. The clock signal CK and the control signal BC1 are in-phase signals, but the falling edge of the clock signal CK is behind of the falling edge of the control signal BC1; namely, the duty cycle of the control signal BC2 is less than that of the clock signal CK. However, after the falling edge of the control signal BC1 occurs, the falling edge of the clock signal CK then occurs; namely, there is a short period of time T4 between the falling edges of the two signals. A period of time T3 is much greater than the period of time T4, and these periodic signals are signals having waveforms repeatedly having a high voltage level and a low voltage level in one frame period.

The operation of the shift register unit 100 is described below in connection with FIG. 3 and FIG. 4. The driving transistor for pulling down the output end G of the shift register circuit 100 as described in the prior art may be the transistor 111 of the driving unit 110. In order to prevent the driving transistor from being continuously stressed to result in a drift in the threshold voltage of the driving transistor such that the output end G cannot be pulled down to a desired voltage level, an embodiment of the present disclosure proposes a technical means in which the transistor 131 of the pull-down unit 130 is used in combination with the control signal BC2 to pull down the output end G to a desired voltage level in advance.

Referring to FIG. 4, in a period of time T1, the clock signal XCK and the control signal BC2 inverted with respect to the clock signal CK are in an enabled state, and the clock signal CK and the control signal BC1 are in a disabled state. Thus, the scan signal G(n−1) of the (n−1)-stage shift register circuit 100 is in an enabled state, and the scan signal G(n−1) is output to the scan line n−1 to drive the display panel 710. The pull-up unit 110 raises the driving voltage Q(n) of the driving node Q according to the scan signal G(n−1), and also the transistor 141 of the pull-down control unit 140 is turned on such that charges present in the capacitor 145 are released by the transistor 141; at this time, the node P at the first end of the transistor 141 is at a low voltage level, and the transistors 142 and 143 are in a cut-off state. The control signal BC2 is at a high voltage level at this time, so the transistor 131 of the pull-down unit 130 is turned on for releasing charges at the output end G to pull down the voltage of the scan signal G(n) to a low voltage level. The transistor 111 of the driving unit 110 is electrically connected to the driving node Q and thus turned on, such that the charges of the output end G may also be released by the transistor 111. At this time, the n-stage shift register circuit 100 mainly functions to release the charges at the output end G and also charge the driving node Q.

In a period of time T2, the timing controller 300 disables outputting the signals that control the scan driver (for example, the clock signal CK and the control signals BC1, BC2), also the touch-enable signal TP_EN is enabled to drive the touch controller 500 to perform touch scanning. Namely, the period of time T2 is a display-pause period of the touch display apparatus 1000. At this time, operation of the shift register circuits 100 within the scan driver 400 are all suspended, and the shift register is thus disabled and suspends outputting the n-stage scan signal G(n). Since external signals such as the clock signal CK are all disabled such that the driving voltage Q(n) of the driving node Q is in a floating state at this time, the driving voltage Q(n−1), the driving voltage Q(n), the driving voltage Q(n+1) of the driving nodes Q of the n-stage shift register circuit 100 and the previous-stage and next-stage shift register circuits 100 and so on leak with time.

In the period of time T3, the touch-enable signal TP_EN is disabled to stop touch scanning, and the clock signal CK and the control signal BC1 are re-enabled to restore display scanning. The clock signal CK and the control signal BC1 are in the enabled state, the transistor 111 of the driving unit 110 is turned on by the high voltage level of the driving node Q such that the clock signal CK passes through the transistor 111, and thus connecting the second end of the transistor 111 to the output end G which starts outputting the scan signal G(n). The transistor 121 of the pull-up unit 120 may also continuously charge the driving node Q such that the driving node Q is maintained at the high voltage level, and also the transistor 151 of the discharging unit 150 is also turned on by the scan signal G(n) such that the transistor 151 may also be continuously charge the driving node Q. Since the transistor 141 is turned on such that the node P is continuously maintained at the low voltage level, the transistors 142 and 143 are in the cut-off state. At this time, the n-stage shift register circuits 100 mainly functions to continuously charge the driving node Q to maintain the voltage level of the driving node Q and output the scan signal G(n).

In the period of time T4, the clock signal CK is still maintained in the enabled state, but the control signal BC1 has been transitioned into the disabled state at this time. Since the gate end of the transistor 151 of the discharging unit 150 is connected to the output end G, the transistor 151 is turned on by the scan signal G(n), such that the charges at the driving node Q are released to a low voltage level by the transistor 151. At this time, the n-stage shift register circuits 100 mainly functions to release the charges at the driving node Q to pull down the voltage level of the driving node Q and output the scan signal G(n) with the remaining charges at the driving node Q. The function of outputting a correct scan signal G(n) while pulling down the voltage level of the driving node Q in advance can be achieved only when the period of time T4 is much less than the period of time T3.

Figure 5:
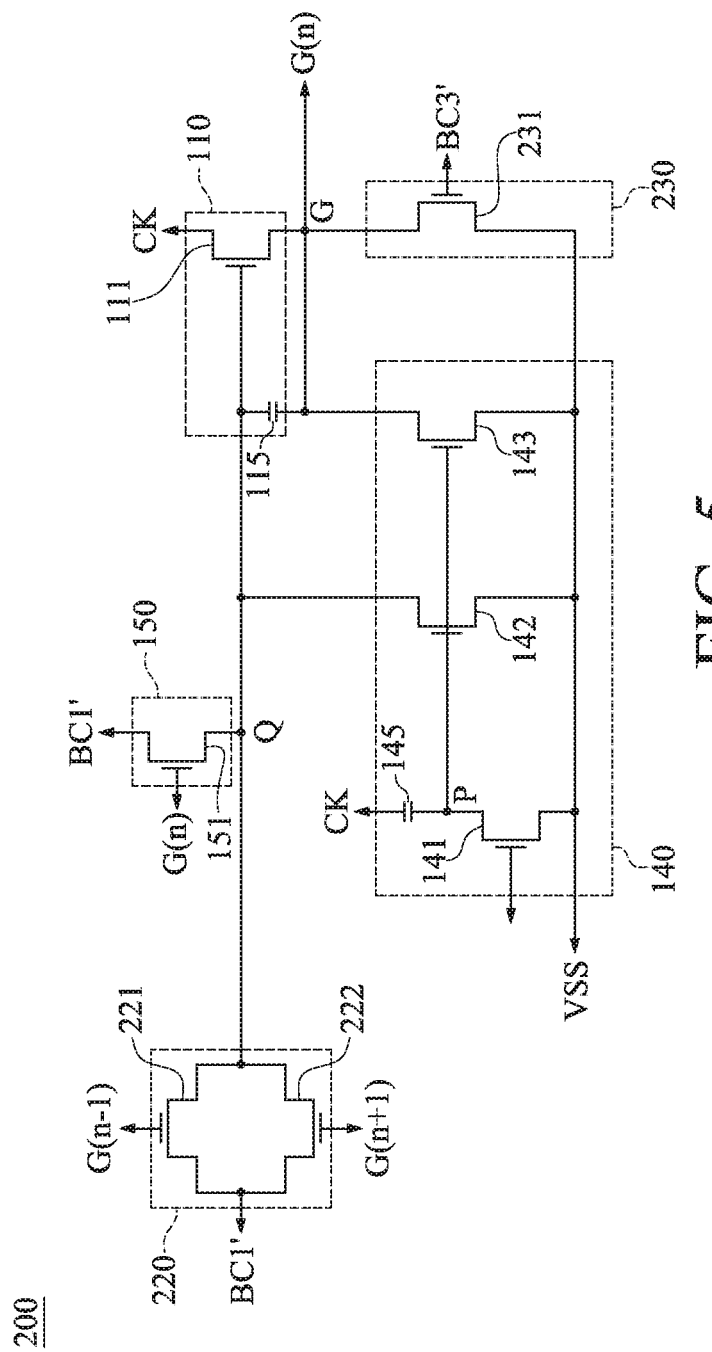
FIG. 5 shows a shift register circuit according to another embodiment of the present invention.

FIG. 5 shows one stage of the shift register circuits 200 of a shift register according to another embodiment of the present disclosure. The shift register circuit 200 generally has a structure and operation similar to those of the shift register circuit 100, and the difference is that the shift register circuit 200 has a bidirectional scanning function, where the pull-up unit 220 includes a transistor 221 and a transistor 222, the first end of the transistor 221 is electrically connected to the first end of the transistor 222 for receiving a control signal BC1', the second end of the transistor 221 and the second end of the transistor 222 are electrically connected to the driving node Q, the gate end of the transistor 221 is configured to receive the previous-stage scan signal, for example, the scan signal G(n−1), and the gate end of the transistor 221 is configured to receive the next-stage scan signal, for example, the scan signal G(n+1). When the scan driver 400 performs forward scanning, the control signal BC1' is received by the transistor 221 to charge the driving node Q; when the scan driver 400 performs reverse scanning, the control signal BC1' is received by the transistor 222 to charge the driving node Q. In addition, the first end of the transistor 231 of the pull-down unit 230 is electrically connected to the output end G, the gate end of the transistor 231 is configured to receive a control signal BC3' inverted with respect to the control signal BC1', and the second end of the transistor 231 is electrically connected to the constant-voltage source VSS.

Figure 6:
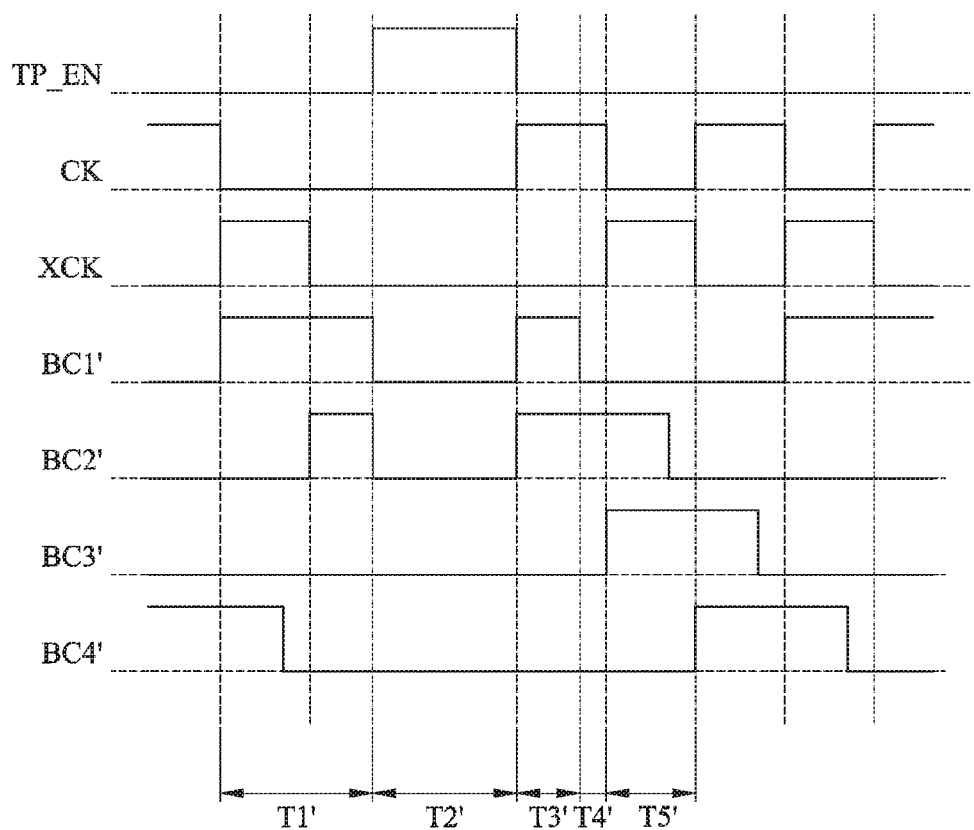
FIG. 6 is a waveform schematic diagram of the shift register circuit in FIG. 5 according to the embodiment of the present invention.

FIG. 6 is a waveform schematic diagram of the shift register circuit 200 in FIG. 5 according to an embodiment of the present disclosure. As shown, the clock signal CK, the clock signal XCK, the control signal BC1', a control signal BC2', the control signal BC3', and a control signal BC4' are all periodic signals, the clock signal CK and the clock signal XCK are inverted and complementary signals, and the control signal BC1', the control signal BC2', the control signal BC3' and the control signal BC4' are successively phase delayed by 90 degrees. In other words, the control signal BC1' and the control signal BC3' are also inverted and complementary signals, and the control signal BC2' and the control signal BC4' are also inverted and complementary signals. The frequency of the clock signals CK-XCK is higher than the frequency of the control signals BC1'-BC4', but the falling edge of the clock signal CK is behind of the falling edge of the control signal BC1'. After the falling edge of the control signal BC1' occurs, the falling edge of the clock signal CK then occurs; namely, there is only a very short period of time between the falling edges of the two signals. Moreover, a period of time T3' is much greater than a period of time T4', the falling edge of the clock signal XCK is behind of the falling edge of the control signal BC2', and these periodic signals are signals having waveforms repeatedly having a high voltage level and a low voltage level in one frame period.

Referring to FIG. 6, in a period of time T1', the clock signal XCK and the control signal BC1' inverted with respect to the clock signal CK are in an enabled state, and the clock signal CK and the control signals BC2'-BC4' are in a disabled state. Taking a forward scanning as an example, the (n−1)-stage shift register circuit 100 outputs the scan signal G(n−1), and the scan signal G(n−1) is output to the scan line n−1 to drive the display panel 710. The pull-up unit 210 raises the driving voltage Q(n) of the driving node Q according to the scan signal G(n−1), and also the transistor 141 of the pull-down control unit 140 is turned on such that charges present in the capacitor 145 are released by the transistor 141; at this time, the node P at the first end of the transistor 141 is at a low voltage level, and the transistors 142 and 143 are in a cut-off state. The control signal BC2 is at a high voltage level at this time, so the transistor 131 of the pull-down unit 130 is turned on for releasing charges at the output end G to pull down the voltage of the scan signal G(n) to a low voltage level. The transistor 111 of the driving unit 110 is electrically connected to the driving node Q and thus turned on, such that the charges of the output end G may also be released by the transistor 111. At this time, the n-stage shift register circuit 200 mainly functions to release the charges at the output end G and also charge the driving node Q.

As the timing controller 300 disables outputting the signals that control the scan driver (for example, the clock signal CK, XCK shown in the period of time T1'), the timing controller 300 outputs the enable period of the control signal BC1' and part of enable period of the control signal BC2'. As shown in FIG. 6, when the clock signal XCK is disable in the period of the time T1', the control signal BC1' still outputs to the shift register circuits 200. In this period, the touch-enable signal TP_EN has not been enable yet. The timing controller 300 may determine the pulse width of the enable period of the control signal BC1', BC2', BC3', BC4' according to the moment to enable the touch-enable signal TP_EN. Therefore, the pulse width of the control signal BC1', BC2', BC3', BC4' may be lengthen in the period of time T1'.

In a period of time T2', the timing controller 300 disables outputting the signals that control the scan driver (for example, the clock signal CK, XCK); also the touch-enable signal TP_EN is enabled to drive the touch controller 500 to perform touch scanning. Namely, the period of time T2' is a display-pause period of the touch display apparatus 1000. At this time, operation of the shift register circuits 200 within the scan driver 400 are all suspended, and the shift register is thus disabled and suspends outputting the n-stage scan signal G(n). Since external signals such as the clock signal CK are all disabled such that the driving voltage Q(n) of the driving node Q is in a floating state at this time, the driving voltage Q(n−1), the driving voltage Q(n), the driving voltage Q(n+1) of the driving nodes Q of the n-stage shift register circuit 200 and the previous-stage and next-stage shift register circuits 200 and so on leak with time.

In the period of time T3', the touch-enable signal TP_EN is disabled to stop touch scanning, and the clock signal CK and the control signal BC1' are re-enabled to restore display scanning. The clock signal CK, the control signal BC1' and the control signal BC2' are in the enabled state, the transistor 111 of the driving unit 110 is turned on by the high voltage level of the driving node Q such that the clock signal CK passes through the transistor 111, and thus connecting the second end of the transistor 111 to the output end G which starts outputting the scan signal G(n). The transistor 121 of the pull-up unit 120 may also continuously charge the driving node Q such that the driving node Q is maintained at the high voltage level, and also the transistor 151 of the discharging unit 150 is also turned on by the scan signal G(n) such that the transistor 151 may also continuously charge the driving node Q. Since the transistor 141 is turned on such that the node P is continuously maintained at the low voltage level, the transistors 142 and 143 are in the cut-off state. At this time, the n-stage shift register circuits 200 mainly functions to continuously charge the driving node Q to maintain the voltage level of the driving node Q and output the scan signal G(n).

In the period of time T4', the clock signal CK and the control signal BC2' are still maintained in the enabled state, but the control signal BC1' has transitioned into the disabled state at this time. Since the gate end of the transistor 151 of the discharging unit 150 is connected to the output end G, the transistor 151 is turned on by the scan signal G(n), such that the charges at the driving node Q are released to a low voltage level by the transistor 151. At this time, the n-stage shift register circuits 200 mainly functions to release the charges at the driving node Q to pull down the voltage level of the driving node Q and output the scan signal G(n) with the remaining charges at the driving node Q. The function of outputting a correct scan signal G(n) while pulling down the voltage level of the driving node Q in advance can be achieved only when the period of time T4' is much less than the period of time T3'.

In a period of time T5', the clock signal XCK and the control signals BC2', BC3' are in an enabled state, and the clock signal CK and the control signals BC1', BC4' are in a disabled state. At this time, the (n+1)-stage shift register circuit 200 outputs a scan signal G(n+1), and so on. Similar, repetitive operation is not repeatedly described herein.

However, the waveforms provided by the present disclosure are not limited to the embodiments provided in the description, and the technical effect of the present disclosure can be achieved as long as the falling edges of the periodic signals configured to control the discharging unit 150 occur earlier than the falling edge of the clock signal of the driving unit 110, such that the driving nodes Q of the shift register circuits 100-200 are discharged in advance by the current-stage scan signal G(n), and the transistor 131 of the pull-down unit 130 releases the charges of the output end G using the periodic signals.

The transistors may be, for example, the same type of transistors or switches, e.g. N-type transistors (for example, N-type thin-film transistors or N-type metal-oxide-semiconductor-field-effect transistors), and the gate end of each transistor is the gate of the N-type transistor. As such, less photomasks may be used for manufacturing the shift register in the embodiment of the present disclosure, thereby simplifying the manufacture process of the shift register. However, the present disclosure is not limited thereto, and any switch having three ends or various types of transistors capable of achieving the circuit having the effect of the present disclosure in connection with the driving waveform of the present disclosure are within the scope of the present disclosure.

The present disclosure also discloses a display apparatus to which the shift register circuit 100 of the present disclosure may be applied, for example, the touch display apparatus 1000 as shown in FIG. 1. When the timing controller 300 outputs the touch-enable signal TP_EN to the scan driver 400 and the touch driver 500, the shift register 100 in the scan driver 400 suspends outputting. The time in which the touch-enable signal TP_EN is enabled may be a blanking period between two adjacent frame periods, a blanking period between two adjacent scan signals, a period in which occurrence of a touch event is detected by the touch display apparatus 1000, or a period in which the scan driver 400 is instructed to stop outputting, which is not only limited to the touch enable period. Whenever the scan driver 400 is instructed to stop outputting the scan signals to the display panel 710, the shift register circuit 100 disclosed in the present disclosure may be used to prevent an incorrect waveform output by the scan driver 400. The touch-enable signal TP_EN may be provided by the timing controller 300 or may be provided by the touch driver 500, but not limited thereto. It will be clearly understood by those skilled in the art that the present disclosure can be achieved as long as the signals inputted to the shift register circuit 100 also make other external control signals disabled.

The present disclosure also discloses an integrated mobile device to which the shift register circuit 100 of the present disclosure may be applied, for example, a touch display apparatus, a photo-touch display apparatus, a fingerprint-recognizing display apparatus, or the like. Whenever the scan driver 400 is instructed to stop outputting the scan signals to the display panel 710, the shift register circuit 100 disclosed in the present disclosure may be used to prevent an incorrect waveform output by the scan driver 400, thereby improving the display quality. However, the present disclosure is not limited thereto, and an integrated driving apparatus comprising two or more drivers can be used with the shift register disclosed in an embodiment of the present disclosure, so as to prevent an incorrect waveform output by the drivers.

In sum, according to a shift register circuit provided by the present disclosure, a driving circuit and a driving method are disclosed, in which an internal node can be charged to a predetermined voltage level through controlling signal waveforms and a discharging unit after operation of the shift register circuit is suspended, in order to prevent incorrect display due to leakage of the internal node in the shift register circuit and ensure that the shift register circuit outputs correct waveforms. Furthermore, according to a shift register circuit provided by the present disclosure, charges at an output end are released through a pull-down unit, in order to prevent a driving transistor of a driving unit from being stressed for a long time to result in a drift of a threshold voltage of the driving transistor.

While the present disclosure has been disclosed above with the embodiments, these embodiments are not intended to limit the present disclosure. All alterations and modifications fall within the scope of the disclosure, without departing from the spirit and scope of the disclosure. Regarding the scope of patent protection as defined by the scope of the present disclosure, refer to the appended claims.

The invention claimed is:

1. A touch display apparatus, comprising:
   a timing controller configured to output a clock signal and a touch-enable signal;
   a touch driver configured to output a plurality of touch driving signals according to the touch-enable signal to drive a touch panel; and
   a scan driver configured to output a plurality of scan signals to drive a display panel, wherein during the enable period of the touch-enable signal, the timing controller disables the clock signal, wherein the scan driver includes multi-stage shift registers, and wherein each of the shift registers comprises:
   a driving unit, electrically connected to a driving node, configured to output a first scan signal to an output end according to the clock signal, wherein the driving unit includes a first transistor;
   a pull-up unit, electrically connected to the driving node, configured to output a driving voltage to the driving node according to a second scan signal, wherein the pull-up unit includes a second transistor;

a pull-down control unit, electrically connected to the driving node, configured to control a state of the driving node according to the clock signal;

a discharging unit, electrically connected to the driving node, configured to adjust the voltage level of the driving node according to a first control signal and the first scan signal, wherein the clock signal and the first control signal are in-phase periodic signals and respectively have a rising edge and a falling edge, and the falling edge of the first control signal is ahead of the falling edge of the clock signal, wherein the discharging unit comprises: a third transistor having a first end, a second end, and a gate end, wherein the first end is configured to receive the first control signal, the second end is electrically connected to the driving node, and the gate end is electrically connected to the output end and releases charges at the driving node according to the first control signal; and a pull-down unit, electrically connected to the output end, configured to adjust the voltage level of the output end according to a second control signal, wherein the first control signal and the second control signal are complementary periodic signals, wherein the pull-down unit comprises a fourth transistor having a first end, a second end, and a gate end, wherein the first end is electrically connected to the output end, the second end is electrically connected to a voltage source, and the gate end is configured to receive the second control signal.

2. The touch display apparatus according to claim 1, wherein the first transistor comprises a first end, a second end, and a gate end, wherein the first end is configured to receive the clock signal, the gate end is electrically connected to the driving node, and the second end is electrically connected to the output end outputting the first scan signal.

3. The touch display apparatus according to claim 1, wherein the second transistor comprises a first end, a second end, and a gate end, wherein the gate end is configured to receive the second scan signal, and the second end is electrically connected to the driving node, outputting the driving voltage to the driving node according to the second scan signal.

4. The touch display apparatus according to claim 1, wherein the second transistor comprises a first end, a second end, and a gate end, wherein the first end is configured to receive the first control signal, the gate end is configured to receive the second scan signal, and the second end is electrically connected to the driving node, outputting the driving voltage according to the second scan signal; and a sixth transistor having a first end, a second end, and a gate end, wherein the first end is electrically connected to the first end of the second transistor, the gate end is configured to receive a third scan signal, and the second end is electrically connected to the driving node, outputting the driving voltage according to the third scan signal.

5. The touch display apparatus according to claim 1, wherein the pull-down control unit further comprises:

a fifth transistor having a first end, a second end, and a gate end, wherein the first end is electrically connected to the output end, the second end is electrically connected to a voltage source, and the gate end is electrically connected to the first end of the fifth transistor;

a seventh transistor having a first end, a second end, and a gate end, wherein the first end is configured to receive the clock signal, the second end is electrically connected to the voltage source, and the gate end is electrically connected to the driving node; and an eighth transistor having a first end, a second end, and a gate end, wherein the first end is electrically connected to the driving node, the second end is electrically connected to the voltage source, and the gate end is electrically connected to the first end of the fifth transistor.

6. The touch display apparatus according to claim 1, wherein a display-pause period occurs within one frame period of display scanning.

* * * * *